US009367718B2

(12) United States Patent
Wild et al.

(10) Patent No.: US 9,367,718 B2
(45) Date of Patent: Jun. 14, 2016

(54) METHODS FOR ENABLING LOW-POWER RFID COMMUNICATION

(71) Applicant: Iotera, Inc., Redwood City, CA (US)

(72) Inventors: Ben Wild, San Francisco, CA (US); Rob Barton, San Francisco, CA (US)

(73) Assignee: IOTERA, INC., Redwood City, CA (US)

( * ) Notice: Subject to any disclaimer, the term of this patent is extended or adjusted under 35 U.S.C. 154(b) by 3 days.

(21) Appl. No.: 14/060,283

(22) Filed: Oct. 22, 2013

(65) Prior Publication Data

US 2014/0111313 A1    Apr. 24, 2014

Related U.S. Application Data

(60) Provisional application No. 61/716,903, filed on Oct. 22, 2012, provisional application No. 61/749,049, filed on Jan. 4, 2013.

(51) Int. Cl.
*H04W 4/20* (2009.01)
*G06K 7/10* (2006.01)
*H04W 48/20* (2009.01)
*H04W 36/00* (2009.01)
*H04B 5/00* (2006.01)
*H04W 72/04* (2009.01)
*H04W 48/18* (2009.01)
*H04W 48/06* (2009.01)
*H04W 92/20* (2009.01)

(52) U.S. Cl.
CPC ............ *G06K 7/10059* (2013.01); *H04W 48/20* (2013.01); *H04B 5/0062* (2013.01); *H04W 36/0022* (2013.01); *H04W 48/06* (2013.01); *H04W 48/18* (2013.01); *H04W 72/0446* (2013.01); *H04W 92/20* (2013.01)

(58) Field of Classification Search
CPC ............ H04W 4/008; H04W 36/0005; H04W 36/0022; H04W 48/20; H04W 48/06; H04W 48/18; H04W 52/0216; H04W 72/00; H04W 72/0446; H04W 76/02; H04W 76/06; H04W 84/18; H04W 88/08; H04W 92/20; H04B 5/0062
USPC .......... 370/280, 321, 395.2, 395.21; 455/436; 340/10.1
See application file for complete search history.

(56) References Cited

U.S. PATENT DOCUMENTS

| | | | |
|---|---|---|---|
| 6,411,645 B1 | 6/2002 | Lee et al. | |
| 6,493,376 B1 | 12/2002 | Harms et al. | |
| 6,700,931 B1 | 3/2004 | Lee et al. | |
| 7,492,316 B1 | 2/2009 | Ameti et al. | |
| 7,593,383 B1 | 9/2009 | Myers | |
| 2003/0146835 A1* | 8/2003 | Carter | 340/539.13 |
| 2005/0007236 A1 | 1/2005 | Lane et al. | |
| 2005/0141997 A1* | 6/2005 | Rast | 416/229 R |
| 2005/0275531 A1 | 12/2005 | Johnson | |
| 2006/0109109 A1 | 5/2006 | Rajapakse et al. | |
| 2007/0013516 A1 | 1/2007 | Freitag et al. | |

(Continued)

*Primary Examiner* — Travis Hunnings
*Assistant Examiner* — Benyam Haile
(74) *Attorney, Agent, or Firm* — Ronald L. Rohde

(57) ABSTRACT

A system and method for enabling low-powered RFID communication that includes at an RFID tag listening for a periodic signal containing beacon signals; synchronizing the internal clock to those beacon signals; identifying access points from the beacon signals; selecting an access point; sending a join request to the access point; identifying the tag to the access point; receiving an assigned time slot; and communicating with the access point in that time slot.

22 Claims, 5 Drawing Sheets

(56) References Cited

U.S. PATENT DOCUMENTS

| | | |
|---|---|---|
| 2007/0126623 A1 | 6/2007 | Workman |
| 2007/0133453 A1* | 6/2007 | Sethi et al. ............... 370/328 |
| 2007/0183370 A1 | 8/2007 | Wallace et al. |
| 2009/0180518 A1 | 7/2009 | Ishii et al. |
| 2009/0180524 A1 | 7/2009 | Wang et al. |
| 2009/0261971 A1 | 10/2009 | Viegers et al. |
| 2010/0039326 A1 | 2/2010 | Lefever et al. |
| 2011/0018691 A1 | 1/2011 | Park et al. |
| 2011/0176464 A1* | 7/2011 | Warner et al. ............... 370/311 |
| 2011/0193958 A1 | 8/2011 | Martin et al. |
| 2013/0111044 A1* | 5/2013 | Cherian et al. ............... 709/228 |

* cited by examiner

METHODS FOR ENABLING LOW-POWER RFID COMMUNICATION

CROSS-REFERENCE TO RELATED APPLICATIONS

This application claims the benefit of U.S. Provisional Application Ser. No. 61/716,903, filed on Oct. 22, 2012, and of U.S. Provisional Application Ser. No. 61/749,049, filed on Jan. 4, 2012, both of which are incorporated in their entirety by this reference.

TECHNICAL FIELD

This invention relates generally to the radio-frequency identification (RFID) communications field, and more specifically to new and useful methods for enabling low-power RFID communication in the RFID communications field.

BACKGROUND

The field of RFID communications is a rapidly growing area of interest with numerous applications across many industries. A number of these applications require RFID communications systems in which RFID tags can transmit information over long distances. Current RFID communications systems that meet this criterion are often expensive and power-hungry. Power consumption as well as cost of RFID components can be prohibitive to new areas and potential application. Thus, there is a need in the field of RFID communications to create new and useful methods for enabling low-power RFID communications. This invention provides such new and useful methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
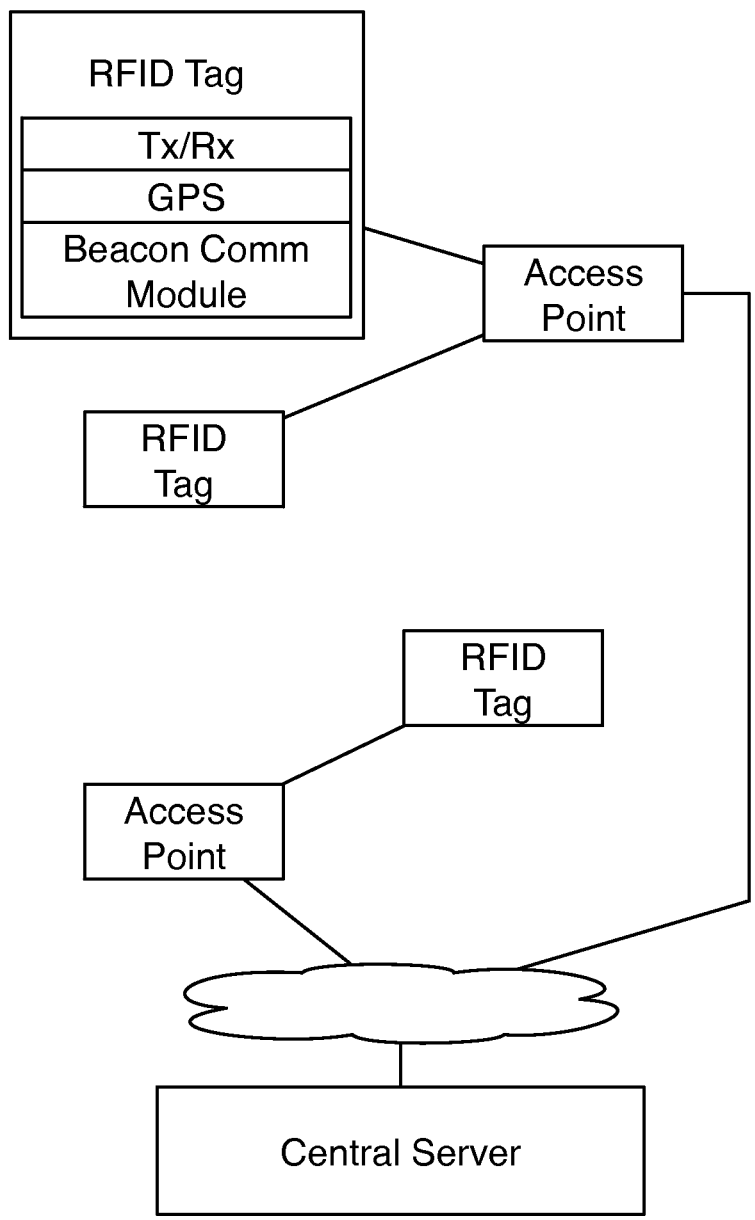
FIG. 1 is a schematic representation of a system of a preferred embodiment.

As shown in FIG. 1, a system for enabling low-power RFID communication of a preferred embodiment can include RFID tags, access points, and a network. The system functions to enable methods of low-power RFID communication. The system is preferably implemented in an RFID communications network to limit power consumption by the RFID tags and to enable efficient communication between RFID tags, access points, and a wide-area network (e.g., the internet). The RFID communications network preferably utilizes RFID tags having an active transmitter, so that the RFID tags may transmit over longer distances than passive tags. The RFID tags are preferably synchronized in time by the aforementioned methods. This time synchronization preferably limits the use of power directed to transceivers of the RFID tags and thus enables the RFID tags to operate more efficiently. This more efficient operation can enable battery-powered RFID tags to operate for a longer duration on a single charge or to operate at a higher transmit or receive power. These methods could therefore find use in exemplary RFID applications such as one requiring low-power RFID communications over longer distances. For example, these methods could be implemented to enable an RFID communications network linking irrigation sensors to the internet. In this example, irrigation sensors would communicate with internet-connected access points via battery-powered active RFID tags operating on the RFID communications network implemented with these methods.

The RFID tags utilized in the aforementioned methods preferably include an antenna for receiving and transmitting data, a battery for powering the tag, and a processor for processing received and transmitted data. The RFID tags may also include memory for storing instructions or data (e.g., flash memory or ROM), an internal clock, an interface for communicating with objects local to the tag (e.g., an RFID tag may have an interface to connect with a water meter in order to transmit water meter data over an RFID network or to send commands from an RFID network to the water meter). The interface for communicating may be wired, infrared, wireless, or any other suitable means for communicating. The RFID tags are preferably capable of broadcasting a signal on more than one frequency, but alternatively may be capable of broadcasting on only one frequency. The RFID tags are preferably capable of receiving signals on multiple frequencies, but may alternatively be capable of receiving signals on a single frequency. The RFID tags are preferably capable of receiving signals on a single frequency at a given time, but alternatively may be capable of receiving signals on multiple frequencies at the same time.

The RFID tags can additionally include a beacon communication module, which functions to manage and coordinate communication through a signal beacon with an access point. The beacon communication module is preferably configured to implement the method S100 described below, but may alternatively implement any suitable variation.

The access points in the aforementioned methods preferably include an antenna for receiving data from and transmitting data to the RFID tags, an internal clock, a network interface to connect to a wide-area network, and a processor for processing transmitted and received data. The network interface is preferably directly connected to the internet, but alternatively may be connected to the internet through another access point or relay, or may be connected to a wide-area network other than the internet. The access points preferably synchronize their clocks to an internet time server, but may alternatively synchronize their clocks using GPS or any other suitable method. The access points are preferably capable of transmitting and receiving on multiple frequencies at the same time, but may alternatively be capable of transmitting on multiple frequencies at separate times, receiving on multiple frequencies at separate times, transmitting on a single frequency, receiving on a single frequency, or any suitable combination of these options. The network interface preferably connects to the wide-area network via Ethernet, but may alternatively connect wirelessly or by any other suitable means. The access point is preferably fixed in position, but alternatively may be mobile. The access point location is preferably known, as in the case of a fixed access point, but may alternatively be discoverable using GPS or any other suitable locating techniques. The access point is preferably powered by a connection to a power grid, but may alternatively be powered by a battery or any other suitable power source.

1. Method for an RFID Tag

Figure 2:
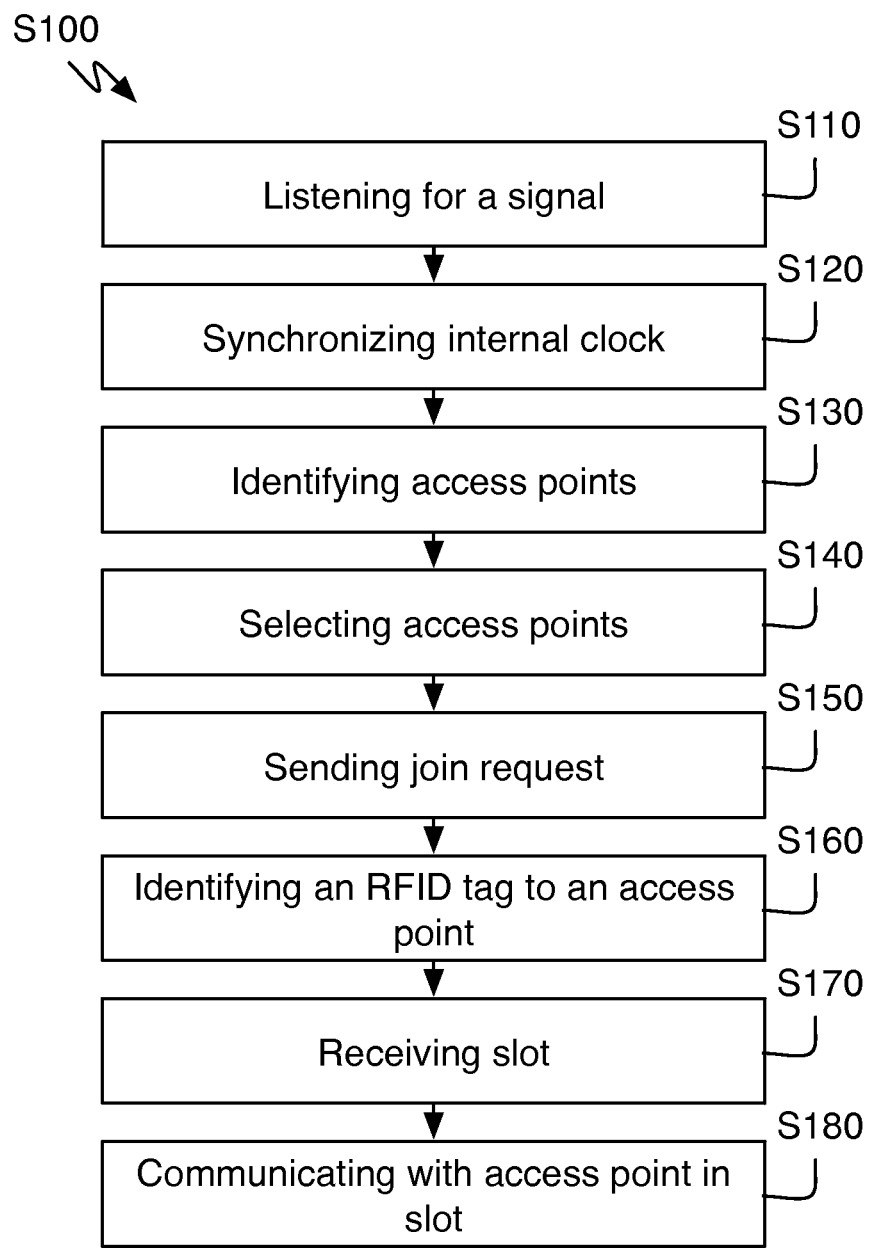
FIG. 2 is a flowchart representation of a first method of a preferred embodiment.

As shown in FIG. 2, a method S100 for an RFID tag with an internal clock of a preferred embodiment includes listening for a periodic signal containing beacon signals S110; synchronizing the internal clock to the beacon signals S120; identifying access points from the beacon signals S130; selecting an access point S140; sending a join request to the access point S150; identifying the RFID tag to the access point S160; receiving an assigned time slot S170; and communicating with the access point in that time slot S180. The method functions to enable low-power RFID communication between an RFID tag and a network connected access point. The method is preferably implemented by an RFID tag of the system described above, but any suitable RFID tag may alternatively be used. In application, the method enables synchronizing, coordinating, and otherwise managing communication of the RFID tag to improve low-power RFID communication.

Step S110, which includes listening for a periodic signal containing beacon signals, functions to allow the RFID tag to discover any broadcasting access points within communications range. The RFID tag preferably listens by turning on a receiver of the RFID tag and tuning to a particular frequency. The RFID tag receiver is preferably turned on by an event directing the RFID tag to join an RFID network. For example, the RFID tag may be directed to join a network whenever the RFID tag has new data to communicate, or the RFID tag may be directed to join a network when the RFID tag has not communicated with a network for a set period of time or for a set distance traveled. As another example, the RFID tag may be directed to join a network after identifying a certain number of access points. As a third example, the RFID tag may be directed to join a network by a transmission over a roaming channel. A roaming channel preferably is a frequency and time slot used by the RFID tag when it is not connected to a network. The RFID tag is preferably directed to join a network by a transmission including the RFID tag's ID. Alternatively, the RFID tag may be directed to join a network by a transmission including a subnet mask of the ID (e.g., the least significant four bits of the ID). Alternatively, the RFID tag may turn on the RFID tag receiver in response to the RFID tag having power, or the RFID tag may not have an active receiver at all. In the case of an RFID tag without an active receiver, the RFID tag receiver is preferably activated in response to a periodic signal of sufficient signal strength. The RFID tag preferably listens for the periodic signal on multiple frequencies, but may alternatively listen on a single frequency. The listening frequencies are preferably set for the RFID tag, but alternatively may be altered in response to receiving information from an access point. For example, the part of the periodic signal on one frequency may include information to direct the RFID tag to other frequencies. The RFID tag preferably listens for a pre-set duration on each frequency, but alternatively may listen for different durations in response to signal conditions. For example, the RFID tag may listen on a frequency where a periodic signal is detectable only until the periodic signal repeats; whereas the RFID tag may listen for a longer time if the RFID tag has not detected a periodic signal. As another example, the RFID tag may alter listening duration in response to not detecting any periodic signal. The periodic signal preferably has a defined period that is constant for a contiguous RFID network. Alternatively, the period may vary or be alterable in response to various network criteria. For example, the period may be automatically set to be the minimum period necessary to allow all access points in a given area to communicate without their transmissions overlapping in space, time, and frequency simultaneously. The periodic signal is preferably transmitted at a single frequency, but may alternatively be transmitted at multiple frequencies simultaneously. If the periodic signal is transmitted at multiple frequencies, the period is preferably constant across the multiple frequencies, but may alternatively be a function of frequency or set according to any suitable approach. If the periodic signal is transmitted at multiple frequencies, the signal preferably contains different content on each frequency. For example, the periodic signal may include an access point beacon for a first access point on a first frequency and an access point beacon for a second access point on a second frequency at the same time. Alternatively, the periodic signal may mirror content across frequencies.

The periodic signal preferably is divisible into a set of time slots. The set of time slots preferably includes a subset of time slots for broadcasting beacon signals and a subset of time slots for communication between access points and tags. The set of time slots may alternatively or additionally include time slots for other communications, such as communications between two access points. The periodic signal preferably includes beacon signals transmitted by access points in a network. The beacon signals function to announce the presence of an access point. Listening for a periodic signal can include detecting or monitoring a frequency or frequencies for a beacon signal. The beacon signals can also function to provide a means for the RFID tag to determine the potential quality of communication with access points (by signal strength) and to determine the rate at which communication with the access point can occur. Each beacon signal is preferably broadcast during a time slot of the subset of time slots of the periodic signal meant for broadcasting beacon signals. Each beacon signal preferably corresponds to a single access point. Each access point may however correspond to more than one beacon signal; for example, a single access point may have multiple beacon signals corresponding to different communication rates, frequencies, or other communication mode options. If an access point has multiple beacon signals associated with it, those signals preferably are broadcast sequentially; i.e. all beacon signals associated with a first access point are preferably broadcast before all beacon signals associated with a second access point, and so on. The beacon signals are preferably ordered such that beacon signals corresponding to more desirable communication mode options appear first. For example, if an access point has a beacon corresponding to a high data rate and another corresponding to a low data rate, the beacon corresponding to the high data rate is preferably broadcast first. RFID tags preferably listen to beacon signals associated with one access point until a beacon signal is heard. For example, an access point may broadcast a first high-rate beacon, a second medium-rate beacon, and then a third low-rate beacon. In this example, an RFID tag hearing the first high-rate beacon may not listen to beacon signal slots corresponding to the medium and low-rate beacons, allowing it to save power. The beacon signals preferably include an identification code unique to the corresponding access point. The beacon signals may also include other information such as the number of network hops from the corresponding access point to the internet, the number of occupied communications slots assigned to the corresponding access point, an occupied slot vector describing which communications slots are occupied, a wakeup vector specifying which communications slots will be actively used during the current period, a load status indicator, or any other relevant information. If a wakeup vector is used, RFID tags not declared active by the vector preferably shut off until the next beacon. Alternatively, the tags may shut off for a longer period of time. The load status indicator preferably conveys the load on the access point. The load status indicator is preferably a value representing the proportion of communications slots occupied; but may alternatively be any other metric representing the load upon the access point. Each beacon signal time slot preferably corresponds to multiple communications time slots. The communications time slots preferably include at least two time slots for each RFID tag to be connected to an RFID network; an upstream time slot (for data to be communicated from an RFID tag to an access point) and a downstream time slot (for data to be communicated from an access point to an RFID tag). Alternatively, if RFID tags without wireless transmitters are used, the communications time slots may include only one time slot for each RFID tag. The communications time slots may also be divided by function; for instance, certain time slots may be dedicated to data transfers while others may be dedicated to transferring data, sending commands, responses, or interrupts. Communicating with the access point in a time slot can include transitioning the RFID tag from a low-power mode (e.g., awakening from sleep mode) during a data transfer time and transmitting data (e.g., measurement from a water meter); the RFID tag listening for a command signal during the command slots (e.g., instruction to shut off the water meter); the RFID tag responding to command (e.g., acknowledging that the water meter was successfully shut). During interrupt time slots, RFID tags preferably communicate in response to non-periodic events, such as a loss of power to the water meter. Some communications time slots may be reserved for particular RFID tags, while others may be reserved for communicating with multiple RFID tags at once or for communicating with other devices.

Figure 3:
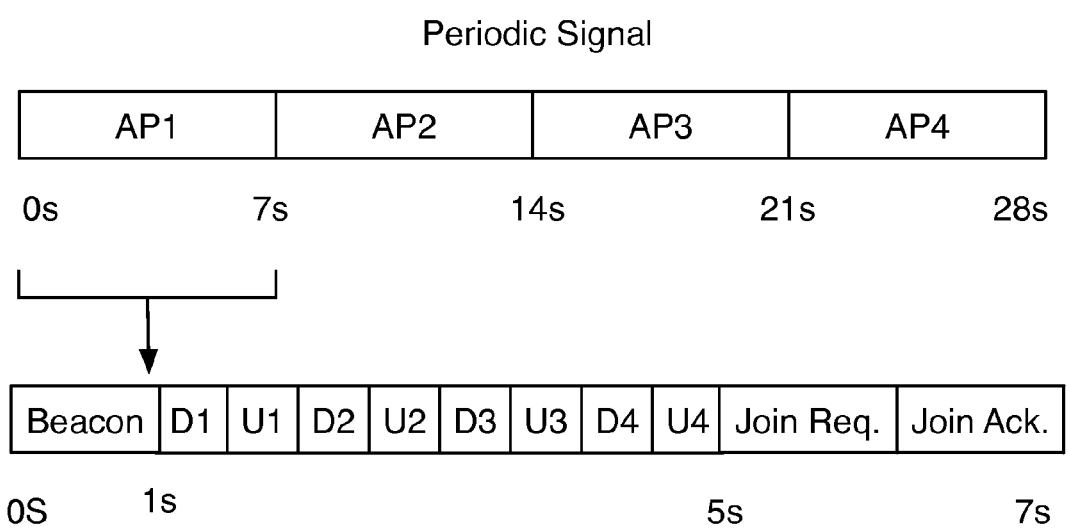
FIG. 3 is a diagram representation of a periodic signal of a first method of a preferred embodiment.

As shown in FIG. 3, the periodic signal for an RFID network can be divided across multiple access points. The exemplary periodic signal shown in FIG. 3 shows a network that includes four access points: AP1, AP2, AP3, and AP4. Each access point communicates on the same frequency, and communicates at a rate of 10 bits per second (note that low data transmission rates and small data sizes is used here for purposes of simplicity). Each access point is associated with one beacon time slot of one second, corresponding to preferably 10 bits though any suitable number bits may be used. Alternatively, an access point can be associated with a beacon time slot of any substantially set window of time and correspond to a designated number of bits. Each access point broadcasts a beacon signal of 10 bits during this time slot; the first two bits are reserved for the access point ID, the next four bits are reserved for a vector specifying communication slot occupancy by RFID tags, and the final four bits are reserved for a vector specifying which RFID tags should wake up for communication. As an example, AP1 can be connected to four tags, and broadcasts a beacon signal encoding the following: '0010101000'. The access point ID for AP1 is '00', the first and third sets of communication time slots reserved for RFID tag communication are actively assigned to RFID tags, and the first RFID tag is requested to wake up for communication. Each beacon signal is preferably followed by eight slots of 0.5 seconds each (for five bits), corresponding to upstream and downstream communication for each of the four sets of communication time slots. Any suitable number of slots may be used and the duration may be any suitable duration and use any number of bits. These eight slots are followed by two joining slots; a join request slot of one second (ten bits) during which tags can request to join the corresponding access point by transmitting their tag IDs, and a join acknowledge slot of one second (ten bits) during which access points can confirm (or deny) a join request as well as transmit a communication time slot assignment. Each access point is thus associated with a section of the periodic signal seven seconds long, for a total period of 28 seconds.

Communications slots and joining slots preferably immediately follow in time in the beacon slot they correspond to (as in the previous example) but may alternatively occur at any point during the periodic signal. As an example, the beacon signals for all access points may occur at the beginning of the periodic signal, followed by the communications slots for all access points.

Step S120, which includes synchronizing the internal clock to the beacon signals, functions to allow the RFID tag to synchronize an internal clock of the RFID tag to a known/standardized time. The RFID tag preferably synchronizes an internal clock to a particular event in the periodic signal (e.g. the beacon of access point with ID '00'), but alternatively may synchronize the internal clock in another suitable way depending on the form of the periodic signal (e.g., the time between two beacon signals). The RFID tag preferably synchronizes the internal clock to a relative time corresponding to the periodic signal (e.g., time zero is the beacon of access point ID '00') but alternatively may synchronize the internal clock to any other suitable time, such as the absolute time used by an access point. All RFID tags in an RFID network are preferably synchronized to the same time.

Step S130, which includes identifying access points from the beacon signals, functions to allow the RFID tag to identify the access points within communications range. The RFID tag preferably identifies access points by the access point ID codes transmitted during the beacon signals, but alternatively may identify access points by the time at which their beacons are transmitted or by another method. The RFID tag preferably also identifies access points by signal strength of an access point (as measured by the RFID tag), transmission rate and frequency of an access point, and the information present in the beacon signal. The RFID tag preferably stores all identification data in memory, but may alternatively only store some information (for example, the access point ID of the access point with the highest received signal strength).

Step S140, which includes selecting an access point, functions to allow the RFID tag to pick an access point to join. The RFID tag preferably selects an access point based on information obtained while identifying access points S130. The RFID tag preferably selects the access point with the highest received signal strength (i.e. the signal strength as measured by the tag) but alternatively may select the access point based on any other suitable criteria. For example, the RFID tag may select the access point with the highest signal strength that also communicates on a particular frequency at a particular transmission rate. As another example, the RFID tag may only select access points that have communication slot occupancies of under 80% (i.e. access points operating at less than 80% of their capacity for RFID tags).

Step S150, which includes sending a join request to the access point, functions to allow the RFID tag to initiate the joining process with the access point selected in S140. The RFID tag preferably sends a join request during a slot of the periodic signal designated for sending join requests, but may alternatively send the join request at another time. The join request is preferably a short signal identified as a join request by time of transmission (e.g. any transmission of a certain length during the join request period would be considered a join request) but alternatively may be a code used only for join requests or any other suitable signal. The join request preferably includes an identification code for the RFID tag, but alternatively may include only a part of an identification code. The join request may also alternatively contain other information about the tag, such as the maximum communication rate the tag is capable of or the tag's battery capacity remaining. If the access point beacon includes an occupied slot vector, the RFID tag preferably sends a join request during an unoccupied communication slot. If the join request is sent during an unoccupied communication slot, the join request preferably comprises a tag ID and data to be transferred to the access point. Alternatively, the join request may be any suitable transmission from the RFID tag. In this way, the RFID tag can transmit data to an access point without first receiving acknowledgment from the access point.

Step S160, which includes identifying the RFID tag to the access point, functions to provide identification of the RFID tag to the access point. The tag is preferably identified while sending a join request S150 but alternatively may be identified at any other time. The tag ID is preferably a number unique to the tag, but alternatively may be any signal capable of identifying the tag. For example, the tag may identify itself using the least significant bits of a unique tag number if a situation is unlikely that another tag with identical least significant bits will be in the same network area. As another example, the tag may be identified not only by the tag ID transmitted but also by the frequency the RFID tag transmits on, or the location the RFID tag transmits from (as determined by the access points).

Step S170, which includes receiving an assigned time slot, functions to allow the RFID tag a specific time slot to communicate with the access point. The RFID tag preferably is assigned two time slots, an upstream slot and a downstream slot. The upstream slot is preferably a slot used for communication from the RFID tag to the access point, and the downstream slot is preferably a slot used for communication from the access point to the RFID tag. Alternatively, the RFID tag may be assigned only one time slot or more than two time slots. If the RFID tag is assigned only one time slot, the time slot is preferably an upstream slot. As an example, an RFID tag attached to a water meter may not need to take commands or data from the access point, and may simply transmit water meter data whenever prompted by a beacon signal; this RFID tag would not need a downstream slot. Alternatively, the single slot may be a downstream slot. As another example, an RFID tag attached to a water valve may not need to communicate information to the access point and may only be needed to control the valve; this RFID tag would not need an upstream slot. The time slots are preferably the same length, but alternatively may be different lengths. Time slots are preferably categorized as either upstream slots or downstream slots, but alternatively may be categorized more specifically. For example, the slots may be categorized as data transfer slots, command slots, response slots, interrupt slots, and/or any suitable type of slot; where these slots are as defined previously. All slots assigned to the RFID tag are preferably assigned only to that RFID tag, but alternatively the RFID tag may share some time slots with other RFID tags. For example, in a network of tags connected to water meters, an access point may want to send the same query (what is the water level) to any tag woken during one period of the periodic signal. In this example, it could be inefficient for the access point to send the same request to separate tags at separate times; therefore, the tags preferably share the same downstream slot but have unique upstream slots. The time slots assigned to the RFID tag are preferably in the same frequency as the beacon signal, but the time slots assigned to the RFID can alternatively be in a different frequency (i.e. the RFID tag may be directed to communicate on a different frequency than the periodic signal). The time slot assignment may also include other frequency information. For example, the time slot assignment may specify a starting frequency corresponding to a frequency-hopping table. The RFID tag preferably receives the assigned time slot during a slot of the periodic signal designated for sending join acknowledgments, but may alternatively receive the assigned time slot at another time. The assigned time slot is preferably transmitted as a short code identifying the time slot, but alternatively may be transmitted in any other suitable manner. The assigned time slot is preferably accompanied by an acknowledgement signal verifying that the RFID tag connected successfully to the network, but alternatively the RFID tag may interpret the time slot assignment as acknowledgment of a successful connection.

Step S180, which includes communicating with the access point in the assigned time slot, functions to allow the access point and the RFID tag to communicate after the RFID tag has joined the network. The RFID tag and access point preferably communicate at the same frequency but alternatively may communicate at different frequencies (e.g. the RFID tag may receive at one frequency and transmit at another). The RFID tag and access point preferably communicate during time slots of the periodic signal associated with the access point and assigned to the RFID tag, but may alternatively communicate during any other suitable time. For example, the RFID tag may send an emergency notification on a frequency and in a time slot not specifically assigned to that tag; more specifically, the access point could have a specific frequency dedicated to reporting water meter bursts that the access point always listens to. In this example, the RFID tag could transmit an ID of the RFID tag over that frequency at any time to notify the access point of a water meter burst. The RFID tag preferably listens for the beacon of the selected access point every round (i.e., every period of the periodic signal) and resynchronizes the internal clock at each beacon. Alternatively, the RFID tag may only listen to the beacon as often as is necessary to maintain time synchronization. The RFID tag preferably communicates with the access point only when necessary in order to minimize energy consumption. As an example, the RFID receiver may only be active during the beacon for its access point, and the RFID transmitter may only be active during the assigned communication slot. If the access point beacon signal includes a wakeup vector, the RFID tag preferably only listens to the beacon signal as long as is necessary to determine if the RFID tag needs to wake up. For example, if the wakeup vector is 1000 bits, but the RFID tag's bit in that vector is the first one; if that first bit is zero, the RFID tag can stop listening after hearing it. The RFID tag and access point preferably transmit and receive at substantially the same data rate. Alternatively, the RFID tag and access point; for instance, the RFID tag may transmit at a lower data rate than the access point, meaning that the upstream data rate is lower than the downstream data rate.

2. Method for an Access Point

Figure 4:
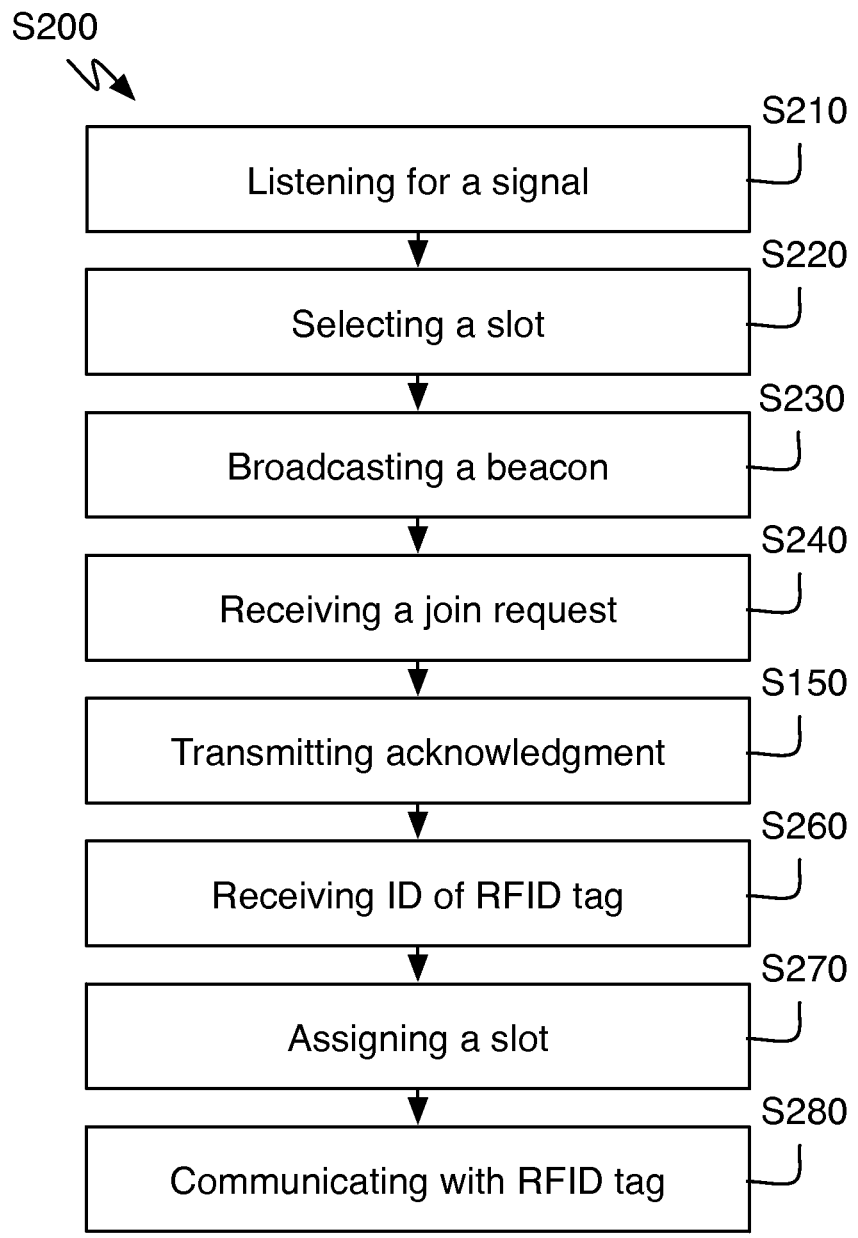
FIG. 4 is a flowchart representation of a second method of a preferred embodiment.

As shown in FIG. 4, a method S200 for an access point of a preferred embodiment includes listening for a periodic signal associated with a set of time slots including beacon signal slots and communication slots S210; selecting an unoccupied beacon signal slot S220; broadcasting a beacon signal during the unoccupied beacon signal slot S230; receiving a join request from an RFID tag S240; transmitting an acknowledgment to the RFID tag S250; receiving identification from the RFID tag S260; assigning a communication slot to the RFID tag S270; and communicating with the RFID tag during the communication slot S280. The method functions to enable low-power RFID communication between an RFID tag and a network connected access point. The method is preferably implemented by an access point of the system described above, but any suitable access point may alternatively be used. In application, the method enables synchronizing, coordinating, and otherwise managing communication of the RFID tag to improve low-power RFID communication.

Step S210, which includes listening for a periodic signal associated with a set of time slots, functions to allow the access point to discover any other broadcasting access points within communications range. The periodic signal is as described in Step S110. The access point preferably listens by turning on a receiver and tuning to a particular frequency. The access point preferably listens and/or monitors for the periodic signal on multiple frequencies, but may alternatively listen on only one frequency. The listening frequencies are preferably set for the access point, but may alternatively be altered based on information received through the access point's network connection or any other means. The access point may listen for the periodic signal utilizing a starting frequency and a frequency hop pattern.

Step S220, which includes selecting an unoccupied beacon signal slot, functions to allow the access point to find a space in time and frequency to broadcast a beacon signal (as described in the first method). The beacon signal preferably is associated with communications slots in the periodic signal. If no periodic signal is found after Step S210, the access point preferably broadcasts a beacon of the access point at a preset interval on a preset frequency, including time for communication slots. Alternatively, the access point may query its network connection to determine settings for the beacon. In this case, once the beacon is broadcast periodically, the periodic signal is created by the presence of the beacon signal. The access point preferably identifies all unoccupied beacon signal slots in a periodic signal, but alternatively may only identify a subset of unoccupied beacon signal slots (e.g., the first available one, or all of the ones that satisfy some criteria, such as data rate). The beacon signal slots may correspond to two different rates of data transmission; that is, there can be both high rate signal slots and low rate signal slots. These slots are preferably not the same length in time, but rather contain the same amount of data (i.e. the high-rate slots are shorter). Because low rate transmissions maintain data integrity at longer distances than high rate transmissions given the same transmission power, the high rate beacon signal slots preferably correspond to short-distance communication and the low rate beacon signal slots preferably correspond to long-distance communication. The access point preferably selects an unoccupied low-rate beacon slot over any unoccupied high-rate beacon slot in order to maximize network coverage. If no unoccupied beacon slots are available, the access point preferably does not broadcast a beacon signal.

Step S230, which includes broadcasting a beacon signal during the unoccupied beacon signal slot, functions to broadcast the beacon signal corresponding to the access point. The beacon signal is as previously described in this and the first method. The beacon signal is preferably broadcast by a transmitter of the access point during the unoccupied beacon signal slot.

Step S240, which includes receiving a join request from an RFID tag, functions to initiate the joining process for an RFID tag. The join request is sent and received in manner substantially similar to that described in Step S150 of the first method.

Step S250, which includes transmitting an acknowledgment to the RFID tag, functions to verify that the RFID tag connected successfully to the network. The acknowledgment signal is preferably an ACK (acknowledgment) in the case of successful join or a NAK (negative acknowledgment) in the case of an unsuccessful attempt). Alternatively, the access point may use the communication slot assignment of Step S270 as a positive acknowledgment.

Step S260, which includes receiving identification from the RFID tag, functions to allow the access point to receive the RFID tag's identification information. The RFID identification is sent and received as described in Step S160 of the first method.

Step S270, which includes assigning a communication slot to the RFID tag, allows the RFID tag a specific time slot to communicate with the access point. The assignment process and the communication slots are described in Step S170 of the first method.

Step S280, which includes communicating with the RFID tag during the communication slot, functions to allow the access point and the RFID tag to communicate. The RFID tag preferably functions to communicate with the access point as described in Step S180 of the first method. Additionally, the access point preferably stores data on the last time the RFID tag successfully connected with the access point. If the access point is not able to communicate with the RFID tag for a period of time longer than a timeout threshold, the access point preferably disconnects the RFID tag from the network and reassigns the communication slots assigned to the RFID tag. The timeout threshold is preferably preset in the access point but alternatively may be set through the network connection of the access point.

3. Method for Managing RFID Tags in an Access Point Network

Figure 5:
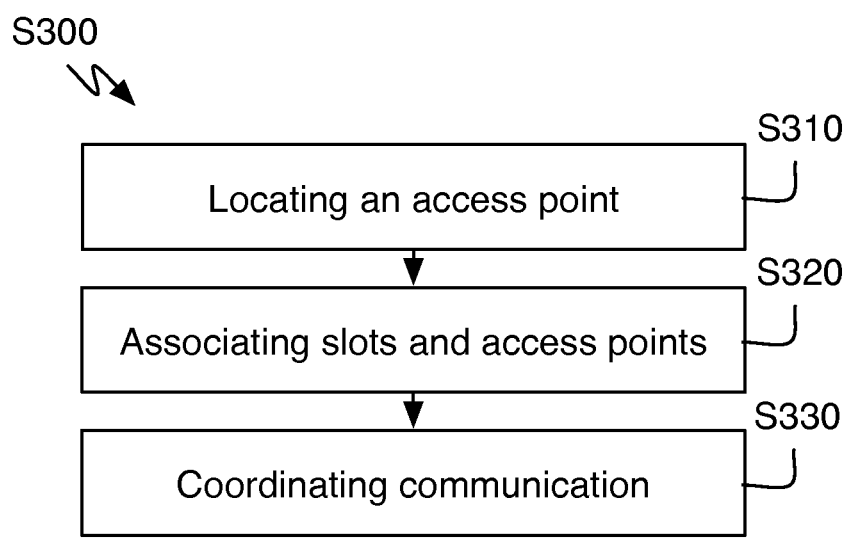
FIG. 5 is a flowchart representation of a third method of a preferred embodiment.

As shown in FIG. 5, a method S300 for managing RFID tags in an access point network includes physically locating a set of access points S310; associating each of the access points with beacon signal slots and communications slots such that each beacon signal slot is associated with a unique access point S320; and coordinating transmission of a periodic signal by the set of access points S330. The method functions to manage RFID tag communication with access points to enable efficiencies of communication and power consumption.

The access point network preferably includes a set of access points and a central server. The central server preferably includes storage, processing capability, and a network interface. The central server is preferably in the cloud, a distributed computing system, a computing cluster, a local/internal server, and/or implemented on any suitable computing system. The central server is preferably connected to each of the access points through a network. The network is preferably the internet, but alternatively may be any other suitable network such as a local network.

Step S310, which includes physically locating a set of access points, functions to determine the physical location of a set of access points. The access points preferably have GPS receivers. The access point network preferably determines the location of the access points by querying the GPS receivers of the access points. Alternatively, the location of the access points may be determined by another method, or may be known (in the case of fixed access points). The locations of the access points are preferably stored in the central server but may alternatively be stored in the access points or in any other suitable location.

Step S320, which includes associating each of the access points with beacon signal slots and communications slots such that each beacon signal slot is associated with a unique access point, functions to allow each access point an avenue of communication to communicate with RFID tags. The associating is preferably performed by the access points as described in Steps S220 and S230 of the second method. Alternatively, the access points may be assigned beacon signal and communications slots manually by the central server. The central server preferably specifies rules for manually assigning slots and assigns the slots based on those rules. For example, the central server may assign beacon signal and communications slots based on a prediction or knowledge of the quantity and location of RFID tags. More specifically, the central server may give a first access point more communications slots than other access points because the central server has predicted that access point will have more RFID tags in closer vicinity than other access points.

Step S330, which includes coordinating transmission of a periodic signal by the set of access points, functions to ensure a continued quality of communication for the access point network. Step S330 preferably includes managing all properties of the access points modifiable over a network interface. For example, the network may reassign communications slots from one access point to another access point to better handle load. As another example, the network may direct access points to change their transmission rate or frequency. The network preferably also coordinates communication of tags as they move in location. For example, if an access point cannot communicate with a tag (possibly because the tag has moved), the network may direct access points nearby to attempt to communicate with the tag using its previous settings. The network preferably directs access points to attempt to communicate with the tag by checking which access point the tag last successfully connected to. It then directs all neighboring access points to communicate with the tag using the same communication parameters (such as time slot or frequency hop pattern) used by the access point the tag last successfully connected to. This process preferably occurs in a round-robin fashion so that nearby access points do not attempt to communicate at the same frequency and time. The network preferably also coordinates communication with disconnected tags over a roaming channel. When the network requests to communicate with a disconnected tag, the network preferably directs the access points nearest to the access point the tag last connected to send out the tag's ID or a subnet mask based on the tag's ID over a roaming channel. The roaming channel is preferably a time slot and frequency that RFID tags listen to when not connected to the network. When the tag hears the tag ID on the roaming channel, the tag preferably attempts to connect to the network.

In addition to managing the control of the access points, the network preferably also coordinates the collection of information from the access points. For example, the network may aggregate and perform analysis on sensor data collected by the access points. As a second example, if access points are dense enough, multiple access point receivers can listen to each tag transmission to improve the quality of the received sample. This is equivalent to the AP2, AP3, and AP4 of the example shown in FIG. 3 listening in on the upstream communications slots of tags communicating with AP1. All of the access points preferably send the received data to the central server, where the data can be combined into a combined dataset. By combining information from multiple access points that all listen to the same tag transmission the effective receiver sensitivity can be improved. Tags that are close to multiple access points can transmit with less power and thus improving battery life. There are multiple approaches to combine tag data to improve receive sensitivity. The first approach is when the access points in the network are equipped with coherent receivers. The tag signal is not decoded at the access point. Rather in this case, the server would be relayed the same tag signal from each access point that is multiplied by an unknown frequency offset and an unknown phase offset. There are many phase and frequency estimation approaches in the literature that can be used to estimate these unknown quantities. Once estimated, the signals can be added in phase and finally decoded to improve sensitivity. The second approach is when the access points in the network that are listening to the same tag all first try to decode the bits and then send the bit stream to the server. The server then attempts to correct tag bit errors using one of multiple approaches. One approach is for every bit to take a majority vote. The second approach is to look at the received signal strength per bit and discard bits that have weak signal strengths. Finally, the server can also combine all the bit information using a waterfilling approach that is well known in the literature. In the third approach, the server does not combine bit information from multiple access points for improved performance. Each access point decodes the message independently. The messages are sent to the server and the message whose CRC has passed is used as the correct message. The central server preferably uses one of these three methods to combine the data and generate a combined dataset. After the combined dataset has been created, the central server preferably creates a data quality metric to evaluate the quality of the data. This data quality metric is preferably a signal to noise ratio but may alternatively be any other appropriate metric. Based on the metric, the central server may direct access points to send commands to RFID tags to change their transmission power. For example, an RFID tag that is far from an access point (or sees a low access point signal strength) may communicate at a high transmit power because of rules that assume this high transmit power is necessary. If the results of several access points are combined, the RFID tag may be able to transmit with a lower signal power (and still be received well) and thus save battery life.

The system and method of the preferred embodiment and variations thereof can be embodied and/or implemented at least in part as a machine configured to receive a computer-readable medium storing computer-readable instructions. The instructions are preferably executed by computer-executable components preferably integrated with the RFID tag and/or access point. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for an RFID tag having an internal clock comprising:
    listening for a periodic signal, wherein the periodic signal comprises a set of beacon signals;
    synchronizing the internal clock to the set of beacon signals;
    identifying a set of access points from the set of beacon signals;
    selecting a first access point from the set of access points;
    sending a join request to the first access point;
    identifying the RFID tag to the first access point;
    receiving an assigned time slot;

communicating with the first access point according to the assigned time slot;
directing a second access point of the set of access points to listen to communication between the RFID tag and the first access point;
combining data received by the first and second access points to create a combined dataset; and
calculating a data quality metric based on the combined dataset.

2. The method of claim 1, further comprising measuring a received signal strength for each of the set of access points; wherein selecting an access point comprises selecting an access point having a received signal strength greater than each other access point of the set of access points.

3. The method of claim 2, further comprising receiving a load status indicator;
wherein selecting an access point comprises selecting an access point according to the load status indicator.

4. The method of claim 1, wherein listening comprises listening at a first frequency; and
communicating comprises communicating at the first frequency.

5. The method of claim 1, further comprising receiving an assigned frequency; wherein communicating with the access point further comprises communicating with the access point at the assigned frequency.

6. The method of claim 5, wherein the assigned frequency comprises a starting hop frequency; wherein communicating with the access point further comprises communicating with the access point according to both the starting hop frequency and a frequency hopping table.

7. The method of claim 1, wherein listening comprises listening for a periodic signal having a first section transmitted at a first data rate and a second section transmitted at a second data rate, wherein the first data rate is higher than the second data rate.

8. The method of claim 7, wherein communicating comprises communicating at the first data rate.

9. The method of claim 7, further comprising measuring a received signal strength for each of the set of access points;
wherein selecting an access point comprises selecting an access point having a received signal strength greater than each other access point of the set of access points and transmitting at the first data rate.

10. The method of claim 1, wherein the access point is associated with a beacon signal slot;
wherein the periodic signal is associated with a set of time slots comprising the beacon signal slot and the assigned time slot;
wherein the tag has a receiver and a transmitter;
further comprising operating the receiver in a powered-on state during the beacon signal slot and in a powered-off state during any other time slot of the set of time slots; and
operating the transmitter in a powered-on state during the assigned time slot and in a powered-off state during any other time slot of the set of time slots.

11. The method of claim 10, wherein operating the receiver further comprises operating the receiver in a powered-on state during the assigned time slot.

12. The method of claim 11, wherein listening comprises listening for a periodic signal transmitting at a first data rate during a first subset of the set of time slots and at a second data rate during a second subset of the set of time slots, wherein the first data rate is higher than the second data rate.

13. The method of claim 1, wherein sending a join request comprises sending a first data transmission in an unoccupied time slot.

14. A method comprising:
listening for a periodic signal associated with a set of time slots comprising beacon signal slots and communication slots using a first access point of a set of access points;
selecting an unoccupied beacon signal slot;
broadcasting a beacon signal during the unoccupied beacon signal slot using the first access point;
receiving a join request from an RFID tag at the first access point;
transmitting an acknowledgment to the RFID tag from the first access point;
receiving identification from the RFID tag at the first access point;
assigning a communication slot to the RFID tag;
communicating with the RFID tag during the communication slot using the first access point;
directing a second access point of the set of access points to listen to communication between the RFID tag and the first access point;
combining data received by the first and second access points to create a combined dataset; and
calculating a data quality metric based on the combined dataset.

15. The method of claim 14, wherein the beacon signal is associated with a first data rate;
wherein communicating comprises communicating at the first data rate.

16. The method of claim 15, further comprising
identifying a second unoccupied beacon signal slot; and
broadcasting a second beacon signal, associated with a second data rate, during the second unoccupied beacon signal slot.

17. The method of claim 16, further comprising communicating with the tag at the second data rate during a second communication slot.

18. A method for managing RFID tags in an access point network comprising:
physically locating a set of access points to create a set of access point locations;
associating each of the set of access points with beacon signal slots and communication slots such that the beacon signal slots associated with any one of the set of access points are not associated with any other of the set of access points;
coordinating communication over a periodic signal, wherein the periodic signal comprises beacon signals transmitted by the set of access points;
directing a first access point of the set of access points to listen to communication between and RFID tag and a second access point of the set of access points;
combining data received by the first and second access points to create a combined dataset; and
calculating a data quality metric based on the combined dataset.

19. The method of claim 18, further comprising detecting a connection timeout for a tag connected to a first access point of the set of access points; and
directing a second access point of the set of access points to attempt communication with the tag;
wherein the first access point is closer in location to the second access point than to any other of the set of access points.

20. The method of claim 19, wherein the tag is assigned a communication time slot by the first access point;

wherein communication comprises communication according to the communication time slot.

21. The method of claim 18, further comprising directing the RFID tag to change transmission powers based on the data quality metrics.

22. The method of claim 18, further comprising directing a subset of the set of access points to send a tag subnet mask over a roaming channel, wherein the subset is selected from the set of access points based on the access point locations.

* * * * *